Patented Aug. 25, 1953

2,650,193

UNITED STATES PATENT OFFICE 2,650,193

METHOD OF PREVENTING FLOTATION OF FLOC

Anton A. Kalinske, Elmhurst, Ill., and Le Roy Henry Scott, Orlando, Fla., assignors to Infilco Incorporated, Chicago, Ill., a corporation of Delaware No Drawing. Application September 23, 1947, Serial No. 775,746

6 Claims. (Cl. 210—23)

This invention relates to the treatment of water by flocculation or coagulation, and particularly is directed to a method for preventing the flotation of floc, or coagulum, which sometimes occurs.

It has long been known that most waters can be treated to remove suspended impurities by use of a coagulant or flocculant, such as alum, iron salts, and the like. It sometimes happens that the character of the water to be treated is such that the floc (which term includes a floc or coagulum, as the designates of "fluocculation" and "coagulation" are usually used interchangeably in the liquid treatment field) tends to float and form a layer of scum on the surface of the liquid to be treated. Heretofore, when such a water was encountered the treatment by flocculation was completely dropped and some other treating method used. Contrary to such prior art teachings we have discovered a simple and inexpensive means by which the flotation of such floc can be prevented.

It is an object of our invention to provide a method by which such flotation can be readily avoided.

It is another object of our invention to provide an improved method for coagulating disintegrated floc particles.

These, and other, objects of the invention will be evident from the description of our process.

We have discovered that flotation of floc is due to the entrapment of a gas in the small floc particles. This gas may be oxygen where the water is saturated with it, but we believe more often it is carbon dioxide which is formed in the flocculation process. We have found that if such water is treated with a normal coagulant, such as alum or iron sulfates, or the like, and the floc then disintegrated to permit the escape of the gas, the disintegrated floc can be reformed into large and dense particles, contrary to prior art teaching. Heretofore it has been believed by those skilled in this field, that a flocculation process must be very carefully handled in order to avoid disintegration of the floc particles. Prior experience had uniformly been that floc particles once broken could not be reformed. However we have discovered that if the newly formed floc is aerated or disintegrated so as to permit the escapement of entrapped gas, the disintegrated floc can be reformed by treating it with a non-gas forming coagulant aid, such as activated silica. By "activated silica" we mean the partially neutralized alkali metal silicate, preferably one which has been diluted and aged to a stage at which incipient precipitation, or gelation, is reached, such as disclosed in the patents to Baylis, 2,217,466, Schworm et al., 2,234,285, or Baker, 2,310,009. Activated silica has heretofore been used in connection with the formation of a floc in water, but in all instances of which we are aware the coagulant, such as alum or iron sulfates, and the activated silica were fed together into the water to be treated. However, in our process, as will be described more in detail hereafter, it is critical that the two be introduced at separate stages of treatment. In our process the water is first treated with the coagulant, such as alum, to provide for the formation of the floc, which will float due to the entrapment of gases therein. The floatable floc is then aerated to provide for the escape of gas. It can be noted that aeration as here practiced involves necessarily considerable agitation and some disintegration of the floc so formed. We use an aeration step only to secure substantially complete degasification of the floc, and aeration of this intensity will involve disintegration. The aeration of the floc can be secured after the floc has been formed and has floated to the surface of the liquid. Also aeration can be secured simultaneously with the dosing and mixing step—and this usually will be preferred as it does not require additional equipment. The water containing the disintegrated floc is preferably then fed into a second treating zone, or chamber, in which activated silica is added and mixed with the water. We have found that the activated silica so added acts as a cementing agent for the agglomeration of the disintegrated floc particles. This is a surprising result, as heretofore it has been uniformly believed that disintegration of the floc must be avoided at all costs as it was thought impossible to reform them after any breaking down.

Perhaps, our invention will be more thoroughly understood if we refer to a particular installation for the treatment of surface water which had an alkalinity to methyl orange of 76 p. p. m., a pH of 7.7, a hardness of 78 p. p. m., and generally a temperature of about 27° C. Many years ago the municipality endeavored to treat this water by coagulation, using alum. The floc formed in the coagulation process floated to the top of the settling basins and formed a thick scum which it was found impossible to separate from the water by any practical means. Because of this reaction, coagulation was abandoned and the only treatment that was used thereafter was "break-point chlorination," followed by addition of a small amount of lime for pH adjustment, and filtration. Prior treatment proving unsatisfactory, research was carried on as to a new method of treating this water. First, the various coagulants such as alum and ferrous and ferric sulfates were used. In all instances, the floc formed by the treatment tended to float and form a thick scum which could not be removed by any modern treating equipment. Activated silica and weighting agents, such as kaolin were added in the hopes that they would overcome the tendency of the floc to float. However, the results were still completely unsatisfactory as the flocs continued to float to the surface. These tests were repeated using water both before and after break-point chlorination, but the flotation of floc was identical in both series of tests.

It was obvious from our investigation of the floc particles that flotation was caused by the entrapment of gas, probably $CO_2$, in the floc particles. It therefore appeared that if the gas could be removed from the floc, the floc would then settle. However, no satisfactory method of separating the gas from the floc without disintegration of the floc was found. Any practical means of removing the gas from the floc involved complete disintegration of the floc, and in view of all prior experiences it was believed to be impossible to reform the floc into satisfactory particles which could be separated from the water. All prior art taught that floc must be handled gently in order to avoid disintegration of the floc particles, for while the particles could be agglomerated during their formation it was found impossible to agglomerate formed particles which had been disintegrated.

Finally, we discovered that if the floc laden water were aerated so vigorously as to disintegrate floc particles and thereby permit escapement of gas from the particles, we could re-cement the particles together by using activated silica. In fact we were able to secure a denser particle form than is ordinarily secured by flocculation treatment.

Many methods of disintegration of the floc particles with simultaneous aeration of the water can be suggested by those skilled in the art. A rapidly moving beater can be used quite satisfactorily. Also good results can be secured by pumping about 5 or 6 times the normal rate of inflow of the water to be treated (using for instance, a high speed centrifugal pump), and spraying the pumped water on to the top of the water in the flocculation chamber. Obviously, the spraying of such material upon the surface of the water in the flocculation basin disintegrates the floc particles and releases the gas bubbles attached to the floc. What is important at this step is that the coagulating material be added to the water, and the dosed water so thoroughly agitated that the floc particles are disintegrated and simultaneously aerated to remove the gas.

Following such treatment the water, containing the disintegrated floc particles is introduced into a second reaction chamber or vessel in which a small amount of activated silica is added and the water stirred in a normal manner. The surprising result is that with such treatment the disintegrated floc is cemented together by the activated silica and forms a dense, good settling floc which can be readily separated from the water being treated. The amount of silica used in our process for such dosing of the disintegrated floc is substantially the same as that used when it is added directly with the coagulant, i. e. 3 to 5 parts per million. In one instance, this particular treatment was continued for a considerable period, during which time no floating floc was found, while the effluent from the second stage was sparkling clear and free of turbidity.

In connection with these tests we also added alum with the activated silica in the second stage, as it was believed that this would assist in the reforming of the floc. However, the additional alum formed a floc containing gas bubbles which caused the whole to float. It is clear, therefore, that the addition of alum and activated silica must be in separate and distinct treating steps, with the disintegration of the floating floc essential as a stage ahead of the addition of activated silica.

The process was also tried using other coagulants and it was found that whenever the formation or presence of gas bubbles interfered with settling of a floc our process was successful. It appears to be immaterial whether the entrained gas which causes the floc to float is oxygen or carbon dioxide gas which may be formed in the reaction between the coagulant and the alkalinity in the water. It also appears to be immaterial whether the coagulant is alum or one of the iron flocculating reagents. It was also found that other non-gas-forming coagulant aids, such as sodium aluminate could be used in place of the activated silica. However, because of its relative cheapness and ease in handling, activated silica is a preferred material to be used.

It is to be understood that the invention is not limited to the details above described but may comprehend such other arrangement or features as may be consistent with the claims. We have described a preferred form of our invention since it appears to us that best results may be secured thereby. However, minor changes will be obvious to those skilled in the art and are intended to be included herein.

It will be noted that our process completely reverses the usual sequence of treating steps. Aeration, which is used frequently in water treatment for taste and odor removal has heretofore always been applied to the water prior to dosing with a coagulant. According to the conventional belief that vigorous agitation of flocs should be avoided and that disintegrated flocs could not be reformed, it was thought objectionable to expose incipient floc to the agitation inherent in aeration. However, we have discovered that the disintegration of flocs caused by their aeration, either after formation or during their formation, does not prevent their reforming. Thus we not only use aeration for a different purpose than heretofore, but we necessarily must use it at a stage of the process which was believed fatal in the prior art.

We claim:

1. In the coagulation of water of a type wherein the flocs formed tend to float, the steps of disintegrating the floating flocs by aeration, thereafter forming the disintegrated flocs into large dense flocs by the admixture of activated silica to the water containing disintegrated flocs, and separating the water from the flocs.

2. In the coagulation of a water of a type which reacts with the coagulant to form flocs floated by gas, the steps of disintegrating the floating flocs to release the gas therefrom, and then admixing to the water containing the disintegrated floc a coagulant aid which is free of the property of forming gas and capable of reforming the disintegrated flocs into settable flocs, and then separating the water from the settable flocs.

3. In the coagulation of waters which react with the coagulant to form flocs floated by entrained gas the improvement which comprises degasifying the gas floated flocs, and then admixing to the water containing the degasified flocs a coagulant aid which is free of the property of forming gas in the water under treatment, and thereafter separating the flocs from the water.

4. In the coagulation of water of a type which reacts with coagulant to form a coagulum which tends to float, a method of preventing flotation of coagulum comprising the steps of agitating the mixture of water and coagulum formed sufficiently to disintegrate the coagulum and thereby release gas therefrom, thereafter treating the mixture of water and disintegrated coagulum with activated silica to reform the coagulum, and separating the water from the reformed coagulum.

5. In the alum coagulation of a water which reacts with alum to form a floc which tends to float, a method of preventing flotation of the alum flocs formed in the water comprising firstly agitating the mixture of water and alum flocs sufficiently to disintegrate the flocs, thereby permitting gas to escape from the alum flocs, secondly treating the mixture of water and degasified, disintegrated flocs with activated silica to reform the flocs, and thirdly separating the water from the reformed flocs.

6. In the flocculation of water wherein a flocculating reagent is mixed with the water and reacts therewith to form floc the method of preventing flotation of the floc formed which comprises the steps of first disintegrating the floc formed to release gas entrapped therein, thereafter admixing activated silica to the water to reform the degasified and disintegrated floc and separating the water from the reformed floc.

ANTON A. KALINSKE.
LE ROY HENRY SCOTT.

References Cited in the file of this patent

UNITED STATES PATENTS

| Number | Name | Date |
|---|---|---|
| 695,399 | Kinsey | Mar. 11, 1902 |
| 1,088,063 | Drechsler | Feb. 24, 1914 |
| 1,656,504 | Schwab | Jan. 17, 1928 |
| 1,722,871 | Weber | July 30, 1929 |
| 1,966,279 | Behrman | July 10, 1934 |
| 2,107,904 | Pool | Feb. 8, 1938 |
| 2,126,164 | Anderson | Aug. 9, 1938 |
| 2,214,943 | Tinsley | Sept. 17, 1940 |
| 2,217,466 | Baylis | Oct. 8, 1940 |
| 2,234,285 | Schworm et al. | Mar. 11, 1941 |
| 2,310,009 | Baker et al. | Feb. 2, 1943 |
| 2,382,490 | Lawlor | Aug. 14, 1945 |